(12) United States Patent
Bass et al.

(10) Patent No.: US 6,898,179 B1
(45) Date of Patent: May 24, 2005

(54) NETWORK PROCESSOR/SOFTWARE CONTROL ARCHITECTURE

(75) Inventors: Brian Mitchell Bass, Apex, NC (US); Jean Louis Calvignac, Cary, NC (US); Anthony Matteo Gallo, Apex, NC (US); Marco C. Heddes, Raleigh, NC (US); Mark Anthony Rinaldi, Durham, NC (US); Michael Steven Siegel, Raleigh, NC (US); Colin Beaton Verrilli, Apex, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/544,896

(22) Filed: Apr. 7, 2000

(51) Int. Cl.[7] .................... H04L 12/26; H04L 1/16; H04B 7/216; G06F 11/00
(52) U.S. Cl. .................... 370/229; 370/335; 370/389; 370/395; 709/223
(58) Field of Search .................... 370/229–232, 370/335–395, 412–419, 438; 709/102, 200–238, 227, 229, 230, 232, 250, 251, 252, 253; 710/100, 107, 110, 113, 305; 712/1, 28, 29, 32, 36, 37, 203, 220, 225

(56) References Cited
U.S. PATENT DOCUMENTS

| | | | | |
|---|---|---|---|---|
| 5,177,679 A | * | 1/1993 | Baxter | 712/36 |
| 6,199,133 B1 | * | 3/2001 | Schnell | 710/110 |
| 6,226,680 B1 | * | 5/2001 | Boucher et al. | 709/230 |
| 6,289,388 B1 | * | 9/2001 | Disney et al. | 709/238 |
| 6,404,752 B1 | * | 6/2002 | Allen et al. | 370/335 |
| 6,427,196 B1 | * | 7/2002 | Adiletta et al. | 711/158 |
| 6,604,136 B1 | * | 8/2003 | Chang et al. | 709/223 |
| 6,606,704 B1 | * | 8/2003 | Adiletta et al. | 712/248 |

* cited by examiner

Primary Examiner—Man U. Phan
(74) Attorney, Agent, or Firm—Joscelyn G. Cockburn

(57) ABSTRACT

The transport protocol for communicating between general purpose processors acting as contact points and network processors in a packet processing environment such as Ethernet is provided. In such an environment, there is at least one single control point processor (CP) and a plurality of network processors (NP), sometimes referred to as blades. A typical system could contain two to sixteen network processors, and each network processor connects to a plurality of devices which communicate with each other over a network transport, such as Ethernet. The CP typically controls the functionality and the functioning of the network processors to function in a way that connects one end user with another, whether or not the end user is on the same network processor or a different network processor. There are three types of communication provided; first, there is communication generally referred to as control services and normally there will be only one pico processor which operates as a GCH (guided cell handler) and only one that operates as a guided tree handler (GTH). A path is provided for the controls to the GCH and the GTH commands, and a separate path is provided for the data frames between the GDH's (general data handler) and the CP.

20 Claims, 15 Drawing Sheets

NETWORK PROCESSOR/SOFTWARE CONTROL ARCHITECTURE

FIELD OF THE INVENTION

The present invention relates generally to architecture for distributing software functions between a control point or a central processing unit and a plurality of network processors and, more particularly, relates to the architecture within the network processors which allows for distributed processing to take place by having various functions performed by dedicated pico processors on the network processors.

BACKGROUND OF THE INVENTION

In many software system architectures, the most critical and time consuming functions are the control functions. There are various different types of control functions, some of which need to occur at once and others that can wait for a period of time. Also, it is necessary that the control functions be performed before the data frames can be exchanged. One of the concerns, therefore, is real time events getting stuck in a queue behind other types of control events in the processor which are not time critical, and these time critical events are then not processed quickly. Delays in processing events which require real time processing directly affect system performance.

Another critical service is table services. Table services are where a large portion of learning takes place, for example building and managing memory trees or tables. If an extensive amount of learning is occurring, this too can quickly tie up the processor and delay real time events from being processed quickly. Finally, data services, basically the frame movement, when an application requires large amounts of data to be sent or retrieved from memory, can monopolize processor time, delaying real time as well as learning events, such as tree or table building. Software and processor system architecture must be taken into account with these three services all competing for processor time.

SUMMARY OF THE INVENTION

According to the present invention, the overall architecture for a network processor software system is provided which comprises two portions, Control Point (CP) which is a general purpose processor and the NP (network processor) which is a special purpose processor. The architecture of the present invention is based principally upon embedded processors, hardware assist units, and various memory locations in the network processors. Logically, there are three processors which make up the architecture for each network processor. Each of the processors is a pico code processor. The three processors are the guided cell handler (GCH), the general data handler (GDH), and the guided tree handler or guided table handler (GTH). Each of these processors has the ability to execute in parallel, provided they are not contending for a common resource. Each of these processors can be programmed in a similar manner. However, the GCH and GTH are programmed to be special use processors since they both have unique responsibilities, other than the responsibilities of a GDH. The GCH is used to process all control frames sent by the CP. The GTH is used to process all control frames that modify table search memory or tree search memory. By using the GTH only for modifying tree search or table search memory, locking is guaranteed. It is to be understood that each network processor may have a plurality of pico processors operating as general data handlers (GDH's) but normally there will be only one pico processor which operates as a GCH (guided cell handler) and only one that operates as a guided tree handler (GTH).

A path is provided for the controls to the GCH and GTH commands, and a separate path is provided for the data frame between the GDH's and the CP.

DESCRIPTION OF THE PREFERRED EMBODIMENT(S)

The present invention relates to the transport protocol for communicating between general purpose processors acting as contact points and network processors in a packet processing environment such as Ethernet. In such an environment, there is at least one single control point processor (CP) and a plurality of network processors (NP), sometimes referred to as blades. In a typical system, there can be two to sixteen network processors, and each network processor connects to a plurality of devices which communicate with each other over a network transport such as Ethernet. The CP typically controls the functionality and the functioning of the network processors, allowing the network processors to function in a way that connects one end user with another, whether or not the end user is on the same network processor or a different network processor. Typically, there are three types of communication required; first, there is communication generally referred to as control services or information. These are communications which are necessary for the network processors to perform their various functions. Also, communication is required for tree building or building tables and maintaining them up to date and accurate. This data has second priority. Finally, there is the data frame that is used to direct data traffic from one end user to another, and these have third priority.

Figure 1:
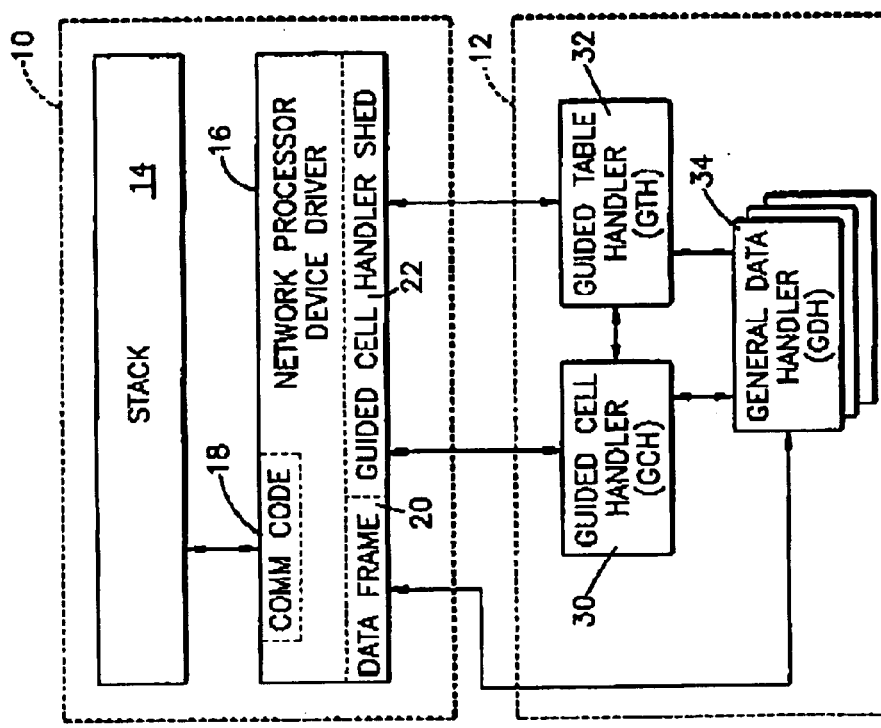
FIG. 1 is a block diagram view of the interconnection between a control point processor and a network processor architecture according to the present invention.

The software architecture of the present invention is principally based on embedded processors, hardware assist units, and various memory locations. FIG. 1 shows a high level diagram of the logical interconnection and data flow between a control point processor (CP) 10 and a network processor or blade (NP) 12 which is connected to the control point processor 10, as will be described presently. (Additional network processors may be connected to the network processor 12 as will be described presently. If more than one network processor is present, the one connected directly to the CP 10 will be referred to as the primary network processor and designated as 12a, and additional network processors will be referred to as secondary network processors and referred to as 12b ... 12n. The control point processor 10 includes a software stack 14 for maintaining the operational state and topology of the system or a subset of the system, and a general purpose processor, a network processor device driver 16, protocol or routing stack 18, data frame component 20, and a guided cell handler component 22.

Figure 2:
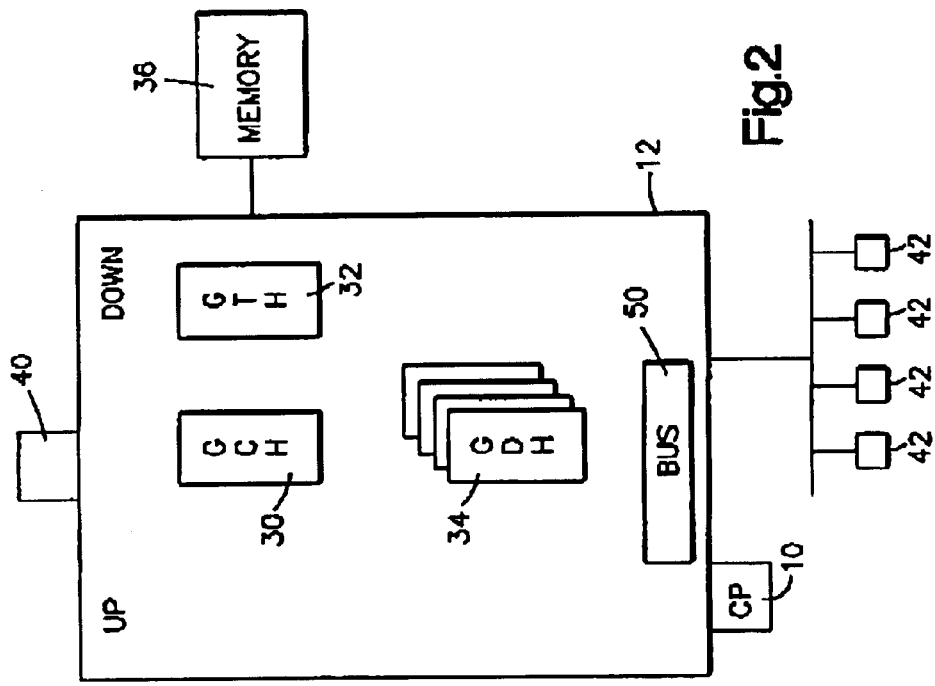
FIG. 2 is a high level view of the relationship of the various pico processors in a primary network processor or blade.

The network processor 12 includes a guided cell handler (GCH) 30, a guided tree handler or guided table handler (GTH) 32, and a general data processor (GDH) 34. As can be seen in FIG. 1, the guided cell handler portion 22 of the device driver 16 is connected to the guided cell handler 30, and the data frame section 20 of the device driver 16 is connected to the general data processor 34. The guided cell handler 30 is also connected to the guided tree handler 32 and the general data processor 34, and the general data handler 34 and guided tree handler 32 are also interconnected. Thus, the guided cell handler portion of the network processor device driver communicates to pass data between this section and the guided cell handler 30 on the network processor 12, and the data frame section 20 communicates with the general data processor 34 on the network processor 12 to pass data back and forth therebetween. Internally within the network processor 12, the guided cell handler 30 can communicate with both the guided tree handler 32 and the general data processor 34 and the guided tree handler 32 and general data processor 34 can communicate with each other. As shown in FIG. 1 and in FIG. 2, the guided cell handler 30 is comprised of a single pico processor (a low lead special performance processor) and the guided tree handler 32 is also comprised of a single pico processor. However, the general data processor 34 is preferably comprised of a plurality of pico processors. The network processor 12 also has memory (either internal or external, or both) 36.

The guided cell handler 30 is a pico code processor which is specifically programmed to perform the control functions. Specifically, it is designed to provide supporting functions to the control point processor 10 and also, to a certain extent, it can do frame forwarding applications running on the general data handler 34. These supporting functions enable a control point processor 10 to control the operation characteristics of the network processor 12. For example, after the network processor 12 boot sequence is completed successfully, the control point processor 10 may build, initialize and configure free lists on the network processor 12. Thus, the guided cell handler 30 enables the control point processor 10 to control the operational characteristics and overall behavior of the network processor 12. Communication between the guided cell handler 30 and the control point processor 10 is through the use of guided frames carrying one or more guided commands. The guided cell handler 30 is an integral part of the network processor 12. The guided cell handler and the general data handler both have an upside and a downside component, as is normal in the art, and is sometimes also referred to ingress and egress processing state. The purpose of processor processing state will be described presently in describing the flow of data frames or control data frames. The communication between the guided cell handler 30 and the control point processor 10 is through the use of guided frames carrying one or more guided commands and, thus, the guided cell handler 30 includes a guided frame processor component 30a, as shown in FIG. 2a.

Figure 2A:
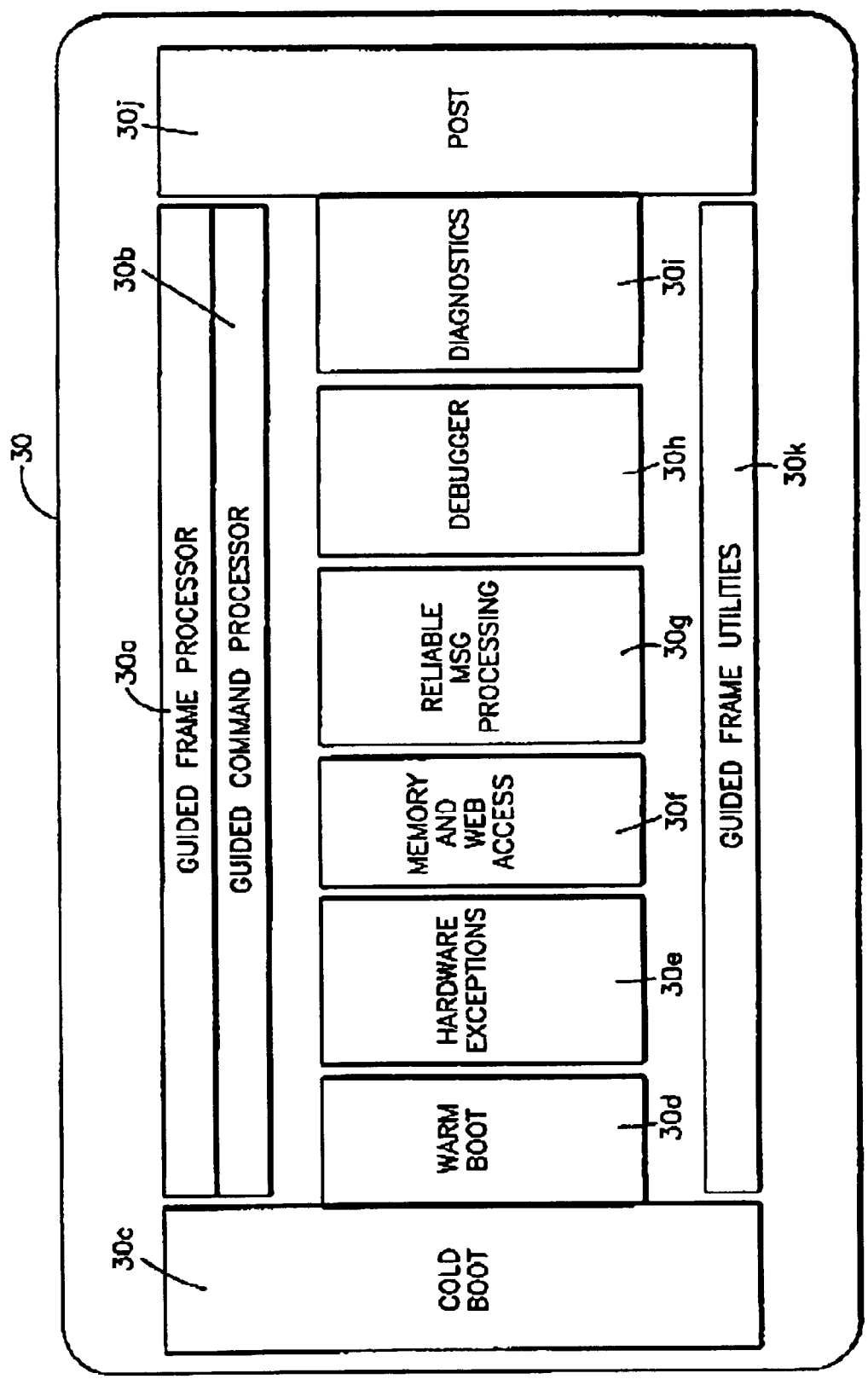
FIG. 2a is a block diagram of the logical components of a guided cell handler.

Still referring to FIG. 2a, the guided frame processor component is responsible for validating the guided request frame and determining whether the guided cell handler 30 is capable of processing the received frame. The guided frame processor also determines the type of acknowledgment (if any) that is required by the sender. If an early acknowledgment is required and the sender was the control point processor 10, it builds and transmits the acknowledgment frame to the control point processor. If the frame is capable of being processed by the guided cell handler, the guided frame processor runs through the request frame until it finds the first guided command to be processed, and then passes control to the guided command processor 30b. On completion of a command, control is passed back to the guided frame processor 30a which continues down the frame until the next command is encountered. This continues until either the guided command processor 30b returns an error or an end__delimiter command is encountered. At this point, frame processing is deemed to be complete. If processing of all the commands is successful and if the control point processor 10 requested a late acknowledgement frame, then the guided frame processor 30a converts the guided request frame into a guided response frame by modifying the frame header appropriately. This frame is then transmitted to the sender. If an error is encountered during the command processing, further processing is halted and a negative acknowledgment response frame is sent to the control point if so specified by the control point processor 10.

The guided command processor 30b is also responsible for processing a guided command embedded in the guided request frame. It is invoked by the guided frame processor 30a with a reference to the position in the request frame where the command is to be found. The guided command processor 30b parses the command identifier to determine whether it is capable of processing the command. If the specified command is unsupported, an error is returned to the frame parser. Else, control is transferred to the appropriate function block in the guided cell handler 30 which actually services the command. The functionality of each of the blocks of the guided cell handle 30 shown in FIG. 2a is described as follows:

The boot block contains functionality that is responsible for booting the network processor 12. It has two components. The cold boot component 30c represents the functionality that is invoked when a network processor 12 is powered up. When the network processor 12 is powered up (usually by the control point processor), the boot-strap loader on the network processor 12 loads the network processor instruction memory with the pico code associated with the cold boot component 30c and transfers control to it. The cold boot component 30c ensures that the network processor 12 is initialized to the point where it can receive and interpret guided request frames. When this point is reached, the component indicates to the control point processor that the network processor 12 is ready to receive guided request frames. The control point processor 10 then continues with the network processor 12 initialization/ configuration by issuing appropriate guided request frames to the control point processor 10. Warm boot component 30d contains functionality that is responsible for resetting the network processor 12 at some point after the latter has been powered up. It is triggered when the control point processor 10 sends a guided request frame containing the appropriate command. A pre-condition to this functionality is the ability to receive and interpret guided frames.

Hardware exceptions block e contains functionality that is responsible for handling exceptions that may be raised due to hardware error conditions that may occur on the network processor 12. Handling an exception always results in a notification being sent to the control point processor 10. Depending on the exception, the control point processor 10 may decide to either log the exception or take corrective measures.

Memory and web access block 30*f* contains functionality that enables the control point processor to directly access a web-addressable as well as non-web-addressable storage elements such as registers or memories. Examples on non-web-addressable storage elements are the up data store, the down data store and the control memories. Using this functionality, the control point processor can read from or write into any addressable memory or register location.

Reliable message processing block 30*g* refers to the guided cell handler functionality that is responsible for implementing network processor 12 and of a control point processor 10 to network processor reliable message transfer scheme. This scheme ensures that frames transmitted by the control point processor 10 are not dropped by the network processor 12 or lost in transit.

Debug block 30*h* represents functionality that enables a control point processor 10 to place the network processor 12 in a mode that facilitates software debugging. Using this facility, a debugger running on the control point processor 10 can be used to debug a general data handler 34 on the network processor 12. Generic debug instructions are sent using guided request frames to the guided cell handler 30. These instructions are executed on the guided cell handler 30 in a hardware-specific manner to achieve the requested functionality. Debug functionality includes the ability to place a specified classifier/lookup processor in a single-step mode, view/change the classifier/lookup processor registers or memories and support for breakpoint execution.

Diagnostics 30*i* and post 30*j* blocks are two aspects of a hardware diagnostics functionality. POST (power-on self test) represents a set of diagnostics that are executed during a cold boot. Successful completion of power-on self test is a necessary, but not sufficient, pre-requisite to the successful completion of the bold boot function. During power-on self test, a minimum set of diagnostics is conducted on the hardware to ensure that it is indeed capable of performing certain basic functions.

Finally, guided frame utilities 30*k* are a set of general purpose functions that are used by all the other pieces of functionality described above in order to do their jobs. An exhaustive list of utilities is not provided here since it is very dependent on a specific implementation of the guided cell handler 30.

The guided cell handler 30 is an inseparable part of the overall network processor functionality since it is specifically designed to provide support functions that enable a control point processor to effectively manage the overall behavior of the network processor 12. By doing so, it frees up the general data handler 34 to do exclusively the functions that it is designed to do, i.e. forward frames at wire speeds. In addition, the guided cell handler 30 may be programmed to forward frames just like a general data handler whenever it does not have a guided frame to process.

Since it is the only processor capable of performing support functions, it is imperative that the guided cell handler 30 be functional in order for the control point processor to manage the network processor and handle exceptions. This is especially true for the guided cell handler 30 on the primary network processor, as will be described presently, since it has the additional responsibility of routing guided frames to the guided cell handler on secondary network processors.

High Level Data/Control Flows

Figure 3:
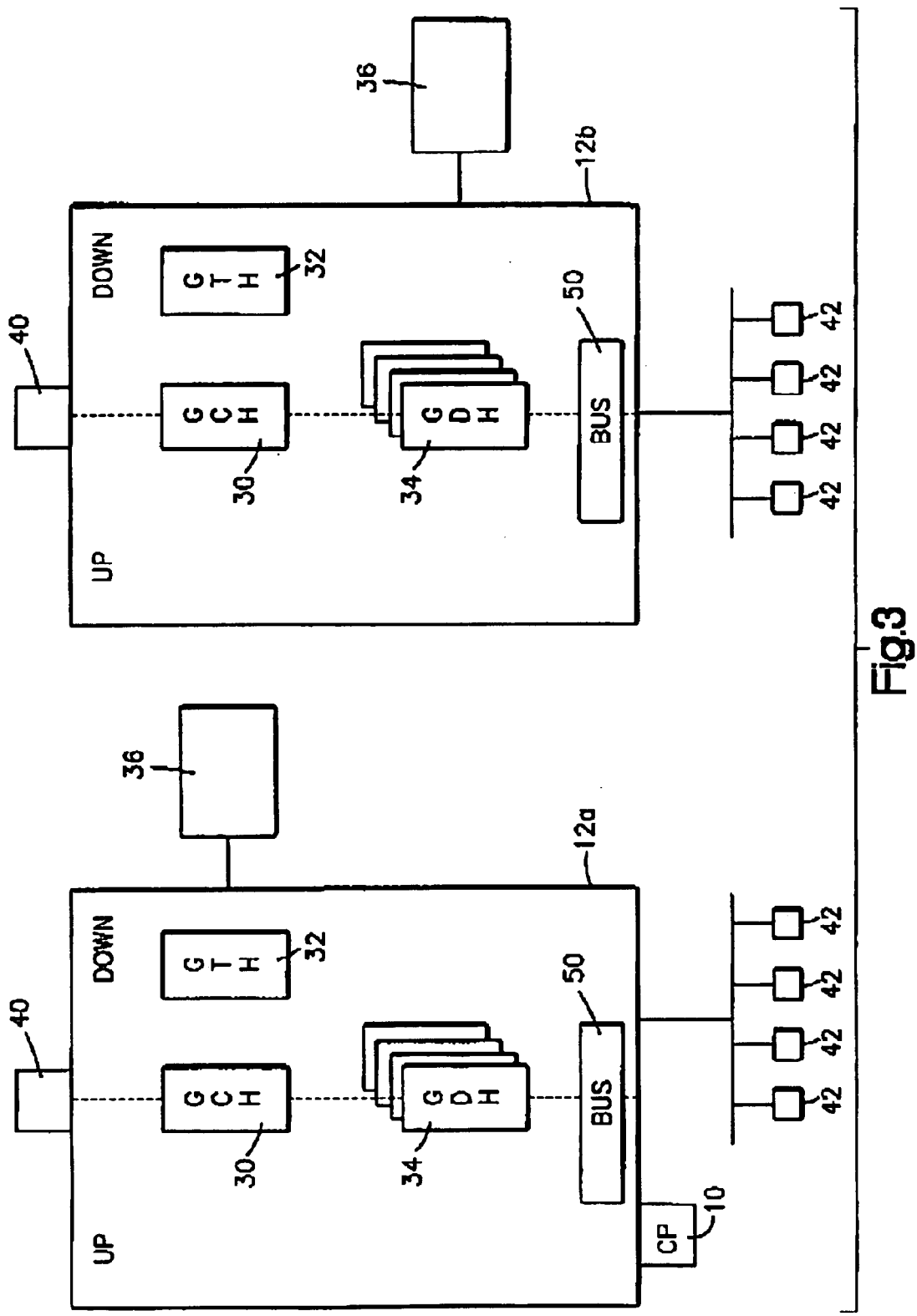
FIG. 3 is a diagram showing two network processors connected as a primary network processor and a secondary network processor.

This section describes the high level data and control flows between the network processor 12 and the control point processor 10. In FIG. 3, a system view of the network is shown with two network processors 12*a* as primary and 12*b* as secondary. There are seven basic flows in the system that are mapped into either data or control flows, as shown in FIGS. 4–10. Data flows are characterized by any traffic either passing throught the system destined for the system, or originating from the system. The control flows are classified as any traffic sent between the control point processor 10 and network processor 12 used for initialization and management of the network processor 12. The control flows are always processed by the GCH 30 on the NP 12. The data flows are described first and the control flows hereinafter.

Figure 4:
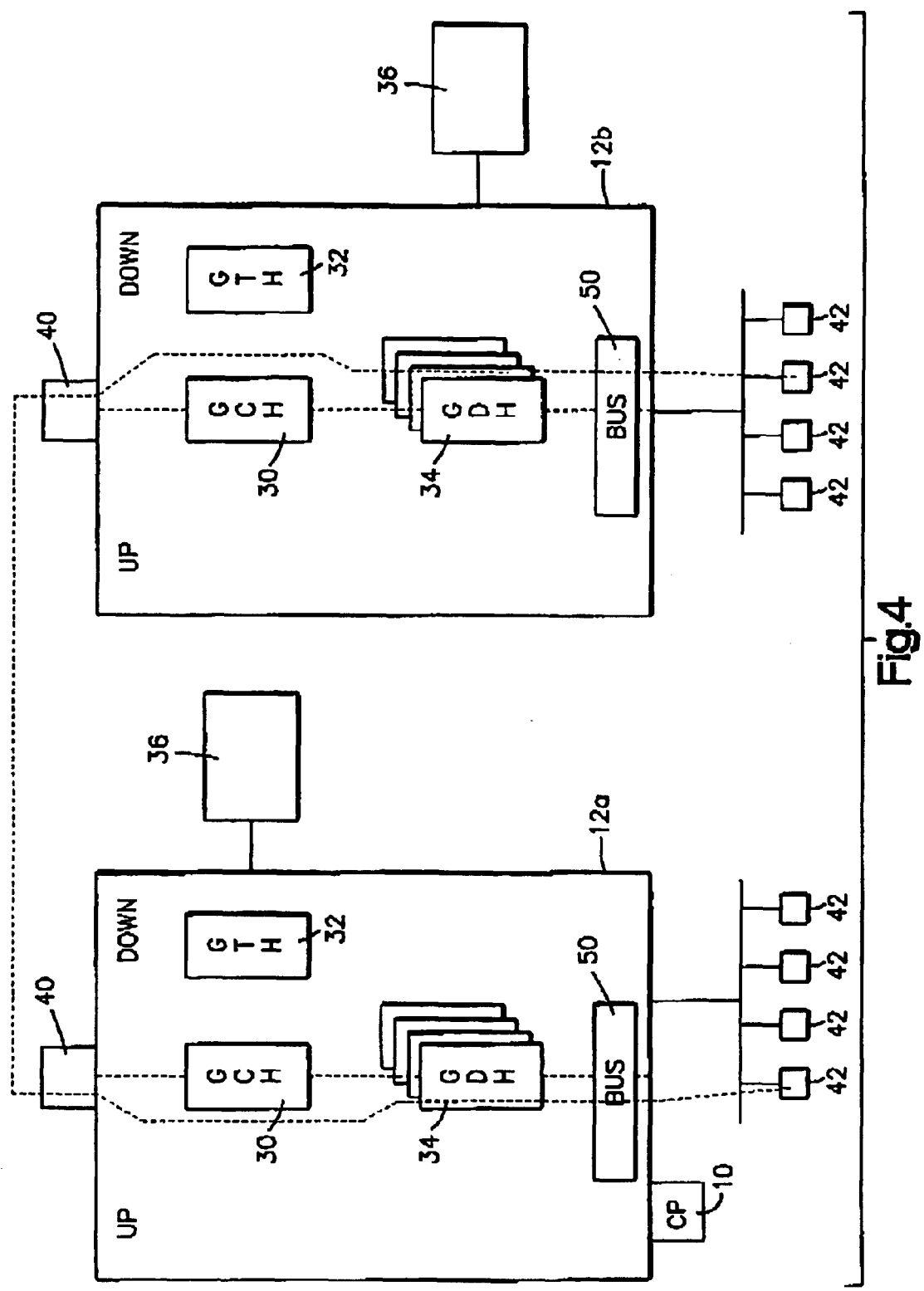
FIGS. 4–10 are diagrams showing various traffic flow patterns in the configuration of processors shown in FIG. 3.

In FIG. 4, the physical port-to-port hardware based data flow is shown. All hardware based flows are received on the upside or ingress processing state of the network processor 12*a* and transmitted on the downside or egress processing state. The upside of the network processor 12*a* uses the GCH 30 and classifies the frame and then performs a lookup to see where to forward the frame. The downside of the GCH 10 will perform any outbound modifications or lookups, if necessary, before transmitting the frame. All frames are passed from the up to the downside using an upside or ingress Switch 40 interface to a downside or egress Switch 40 interface. This is an external interface and requires traffic to be wrapped outside the chip even when the source and destination ports reside on the same network processor 12.

Figure 5:
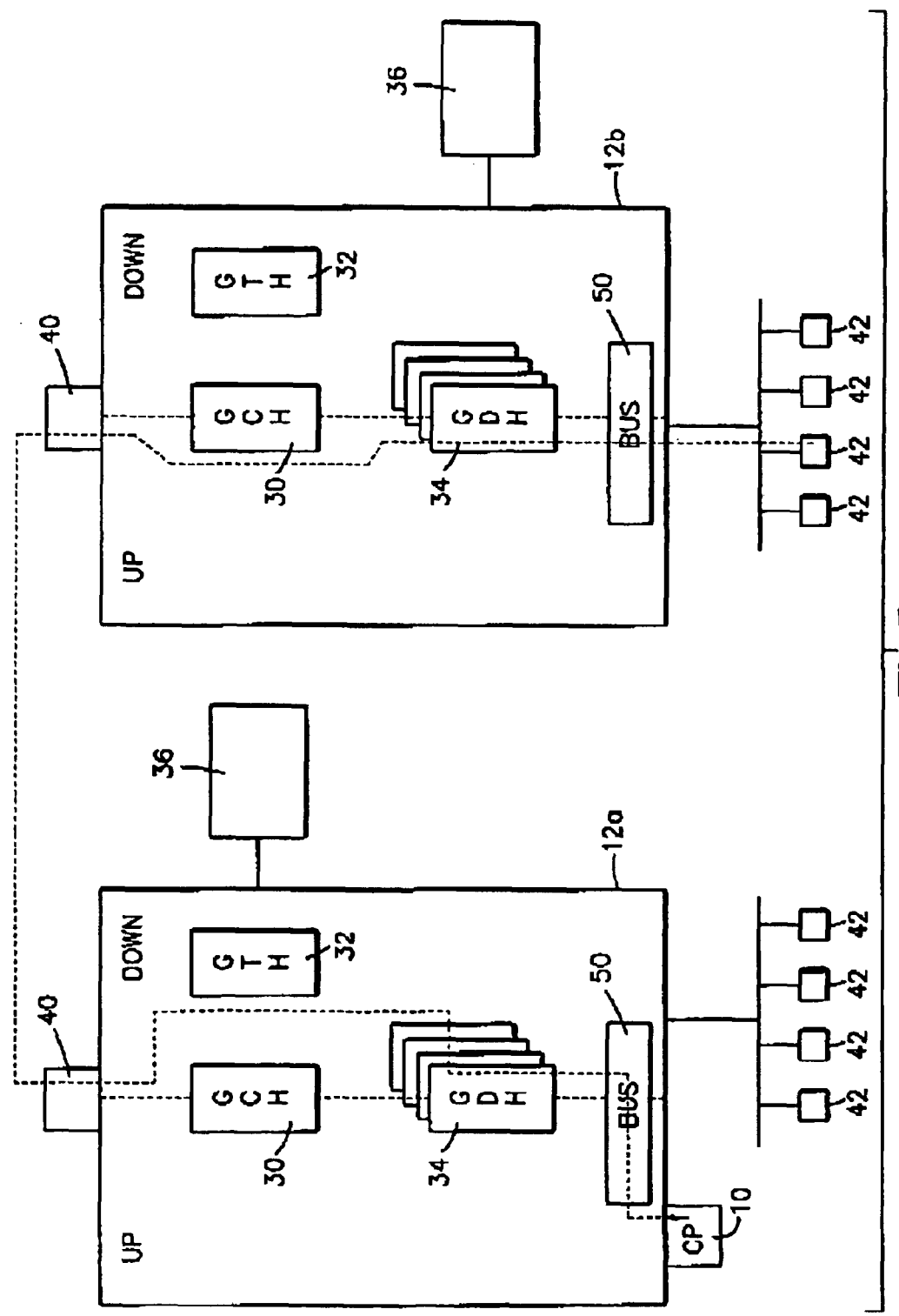

Frames received by a media port 42 that cannot be forwarded in hardware and are destined for the system must be forwarded to the CP 10. In FIG. 5, a frame is shown being received on a media port 42, and then being forwarded to the CP 10. When the upside GCH 30 processes the frame, it will determine that the CP 10 is the final destination and forward the frame, as in the previous example. On the downside, the GCH 30 will also perform any outbound processing and transmit the frame to the CP 10 as if it were a media port.

Figure 6:
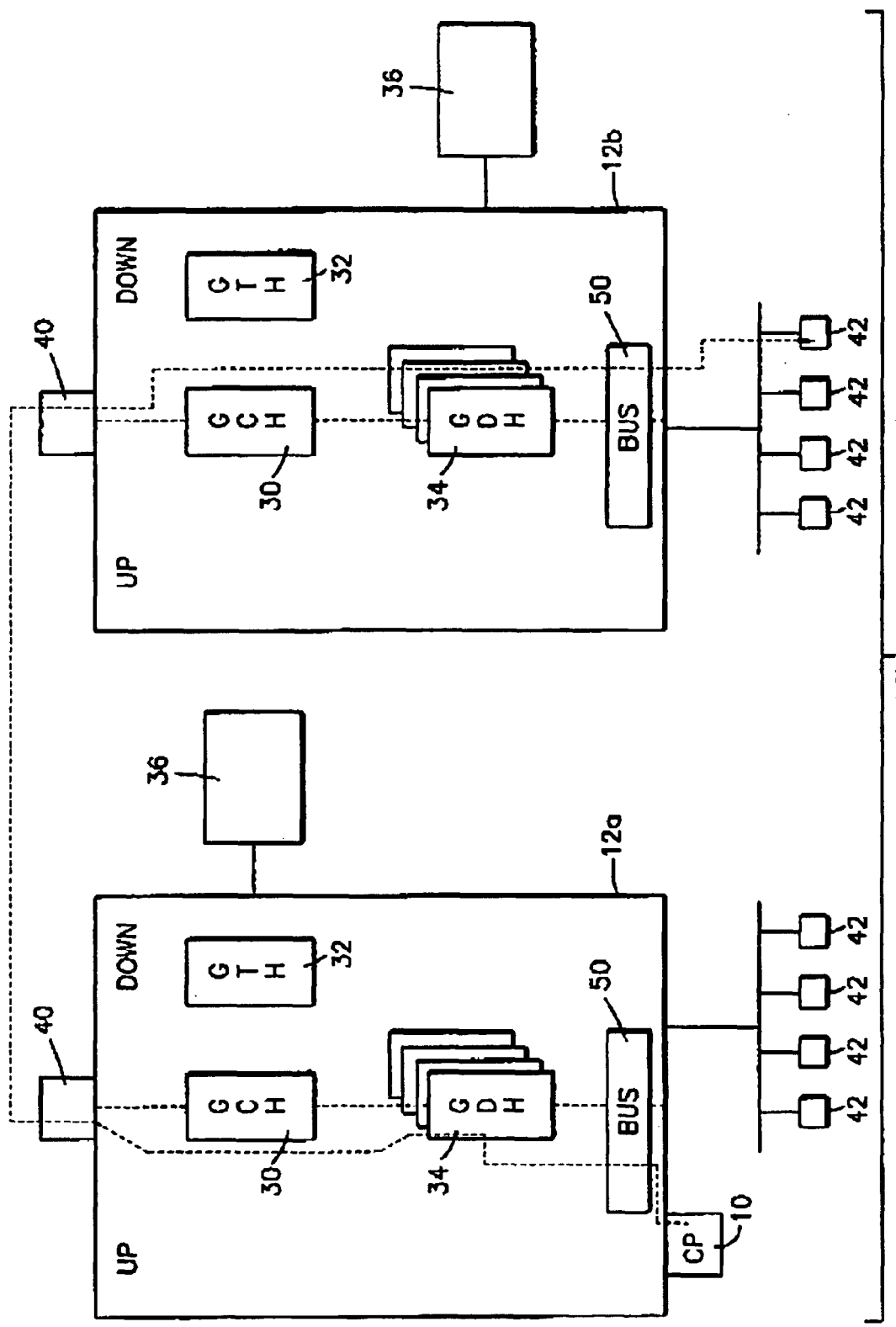

FIG. 6 is the CP 10 attached to network processor 12*a* media port 42 data flow. The flow here is also the same as in FIG. 4 where the frame must pass through the upside GDH 34 on network processor 12*a* where the CP 10 is attached and then through the downside GDH 34 and the network processor 12*b* where the media port is attached.

Figure 7:
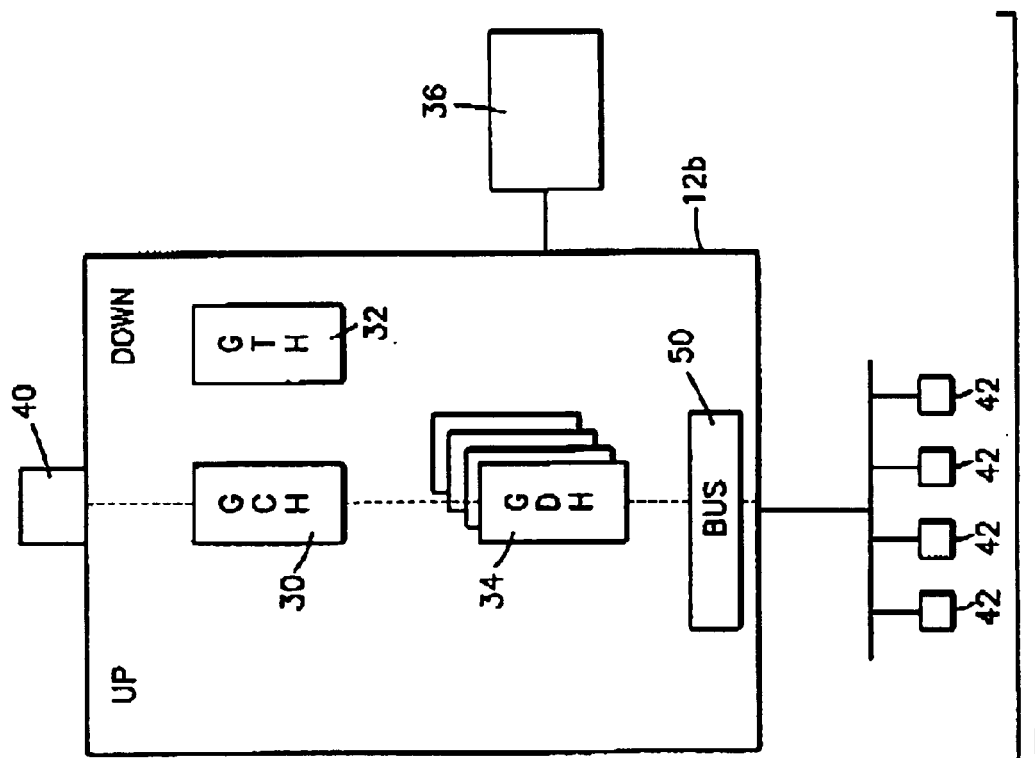
Figure 7:
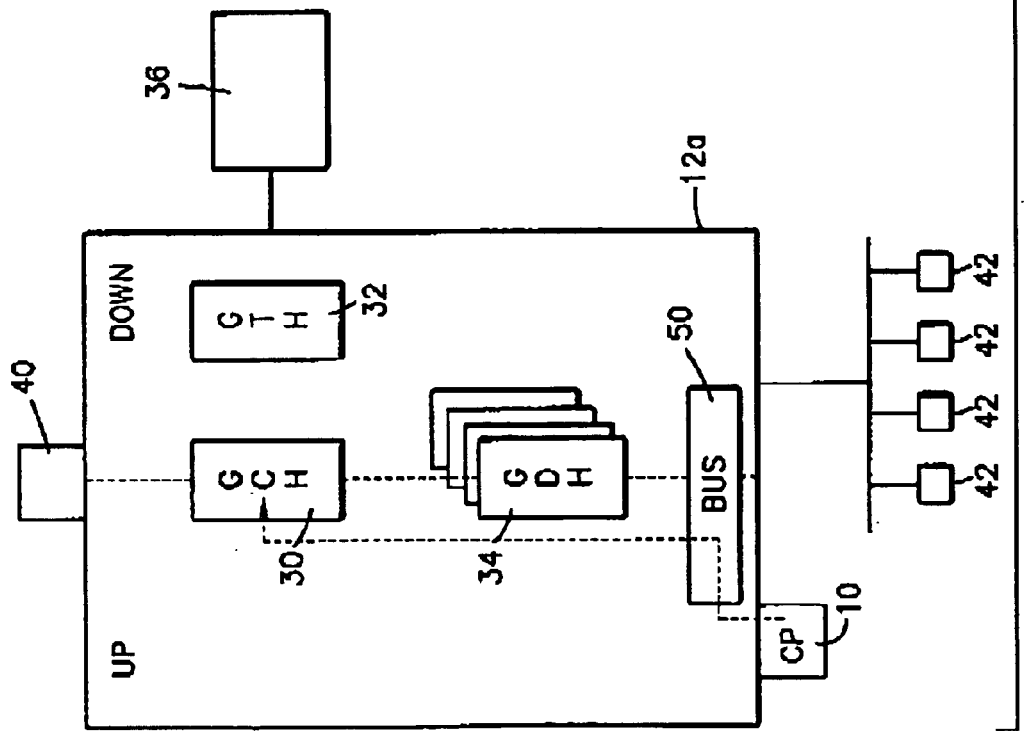
Figure 8:
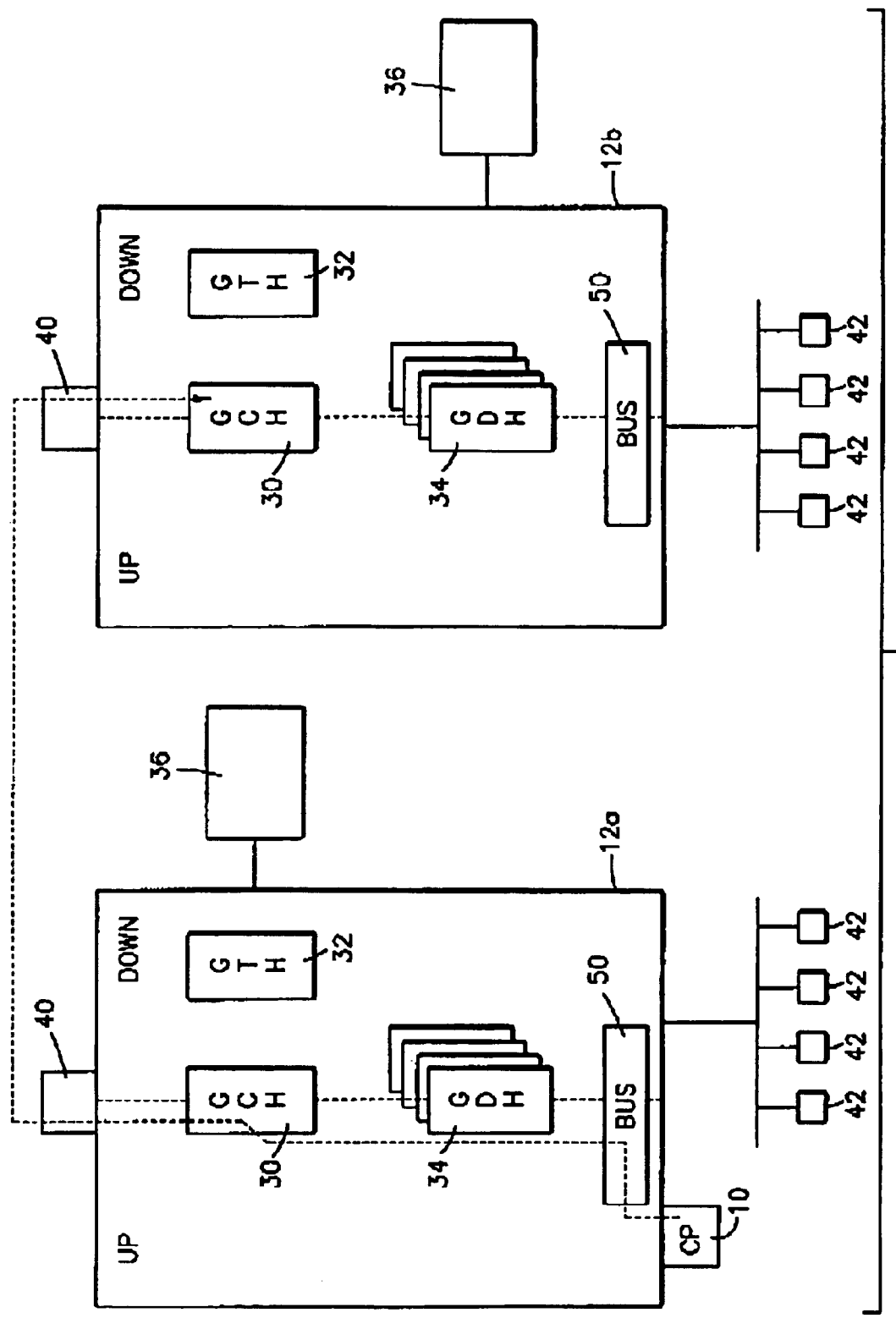
Figure 9:
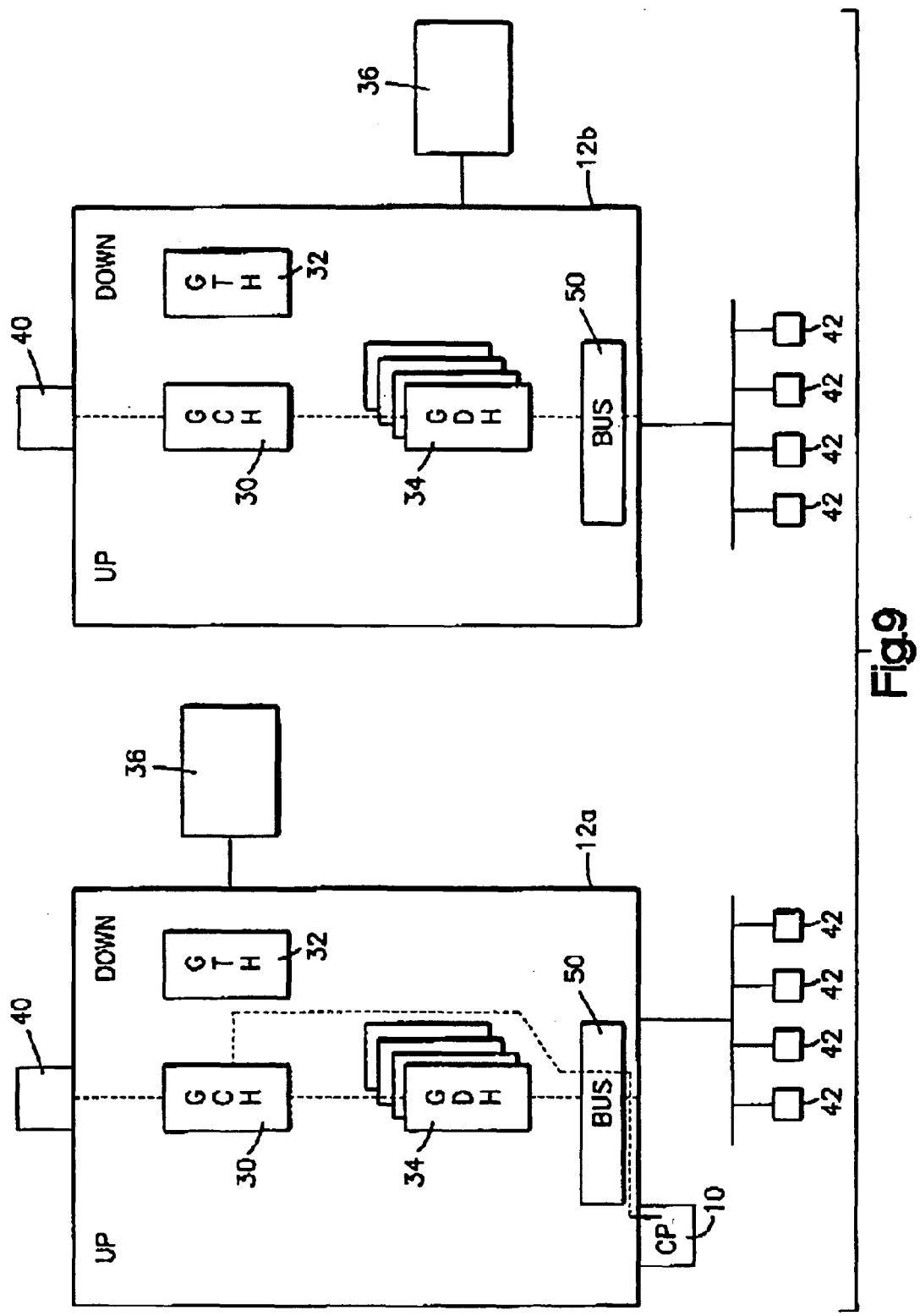
Figure 10:
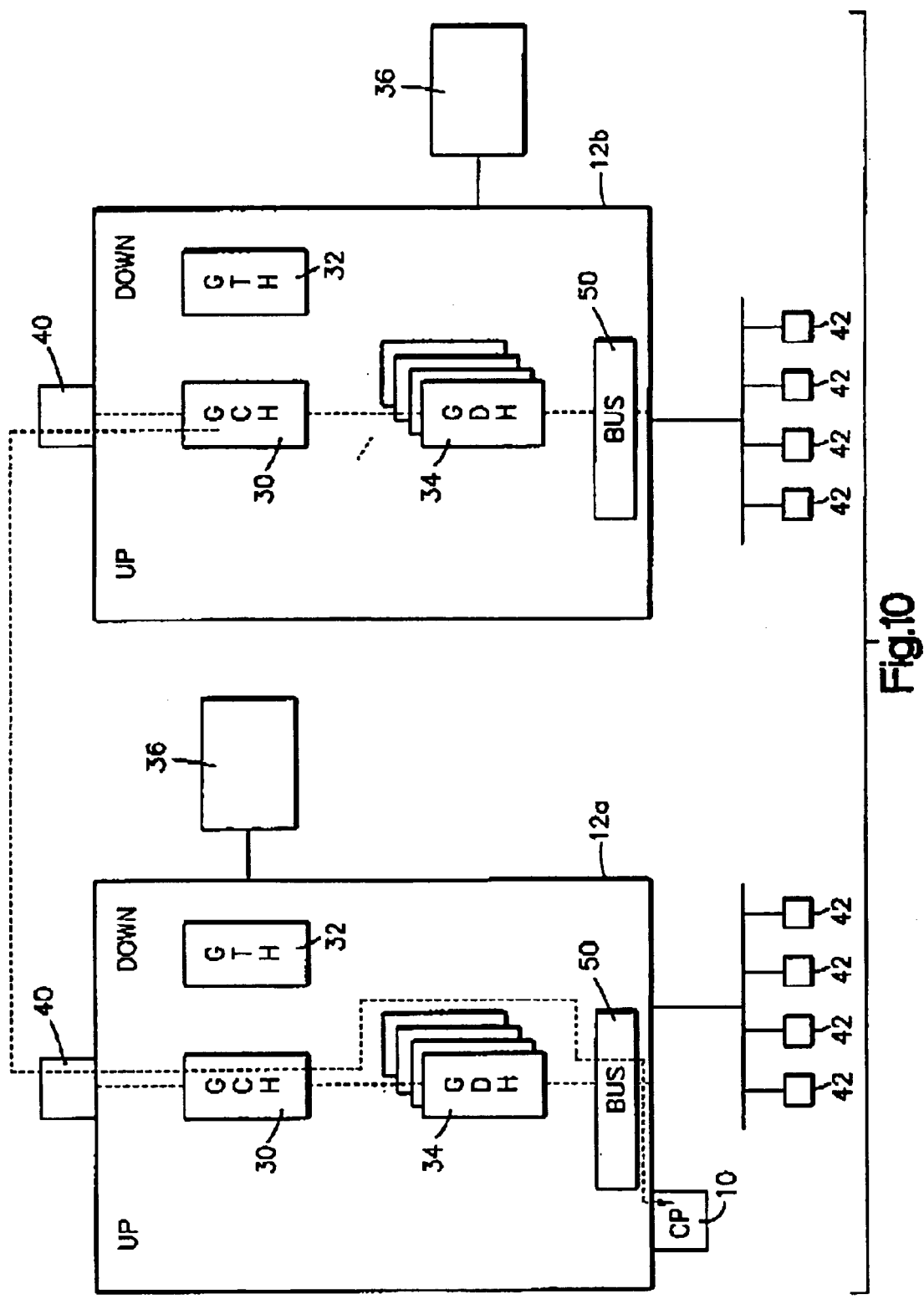

The control flow shown in FIG. 7 is where CP 10 is sending control information to the primary network processor 12*a* to which it is attached. The flow has a special bit identifier which routes all guided traffic to the GCH 30 on the upside. The control flows are slightly more complex than the data flows since the GCH 30 on the primary network processor 12*a* with the CP 10 attached must also route guided traffic to the other network processors 12*b* . . . 12*n* in the system as well as process guided traffic. The routing of guided traffic can be seen in FIG. 8 where the CP 10 needs to send control information to the remote or secondary network processor 12*b*. In FIG. 9, the reverse path is shown where the GCH 30 on the primary network processor 12*a* forwards the control information to the CP using the downside for a locally attached CP 10, and FIG. 10 for a CP attached to a secondary network processor 12*b*. The primary difference between downside processing for primary and secondary network processors 12*a*, 12*b* is that secondary processing must use an internal wrap function (not shown) to route the guided traffic to the NP subsystem where the CP resides. The GCH 30 will be discussed again in more detail hereinafter.

There are also several additional features of flows that should be noted. First network processors 12,*a,* 12*b* can exchange control information between each other in addition to the CP 10. This is a subset of the function described in the FIG. 10 flow. Second, both control and data flows can be unicast or multicast flows. Third, control information can be inserted into data flows using a flexible software header. Finally, data flows passing through the system can cause control flows to be generated within the system.

The guided cell handler 30 on the network processors 12*a,* 12*b* . . . 12*n* are responsible for the handling of all guided traffic. As previously mentioned, guided traffic is the primary method of communication between the CP 10 and network processors 12*a,* 12*b,* . . . 12*n.*

Figure 11:
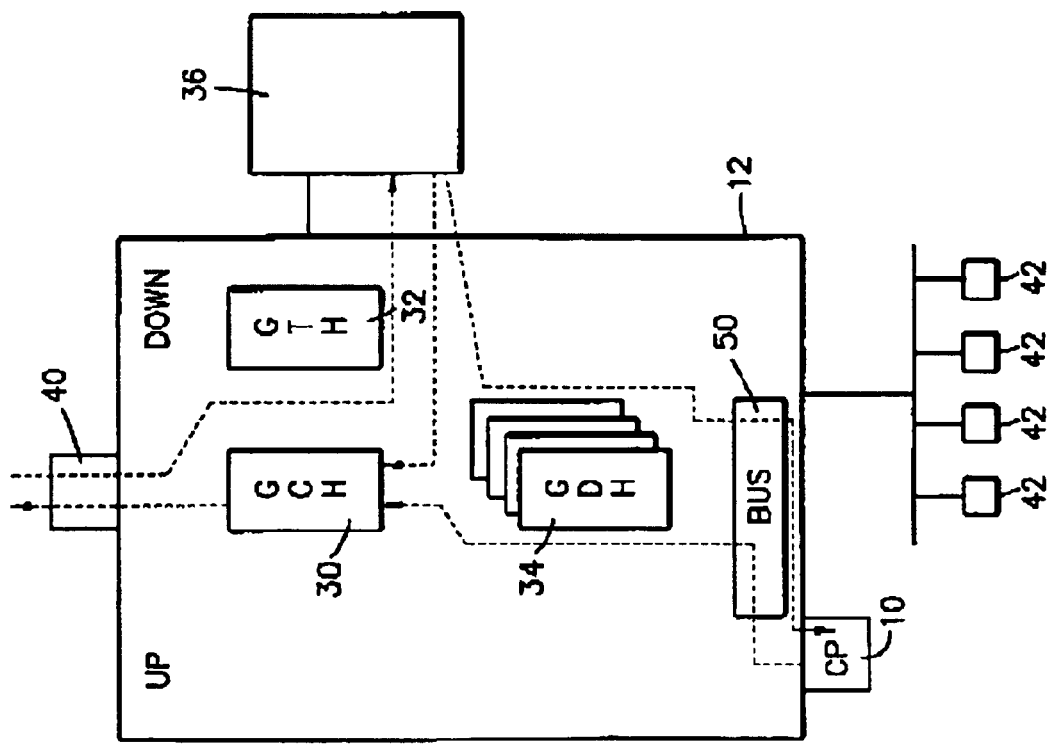

The guided traffic flow with the CP 10 locally attached to a network processor can be seen in FIG. 11. Guided traffic sent by the CP 10 is received on the bus and identified as being guided traffic by its header. The guided traffic is stored in upper data store and dispatched to the GCH when the End Of File (EOF) is encountered.

The GCH 30 on the primary network processor 12*a* with the CP 10 locally attached examines the guided traffic to determine whether the frame is intended for this network processor 12*a* or some other network processor 12*b* . . . 12*n* in the system. If the frame is intended for this NP 12*a,* the GCH 30 will analyze the frame and perform the operation indicated by the guided traffic. Otherwise, the GCH forwards the frame to the appropriate unicast or multicast NP's 12*b* . . . 12*n.*

The GCH 30 on each NP 12 will also forward tree search memory requests to the GTH 32 for processing. The GTH 32 is simply an off load processor to the GCH 30. Functionally, the GCH 30 can process all guided traffic requests but, for performance reasons, the GTH 32 is used for table or tree memory requests.

Figure 12:
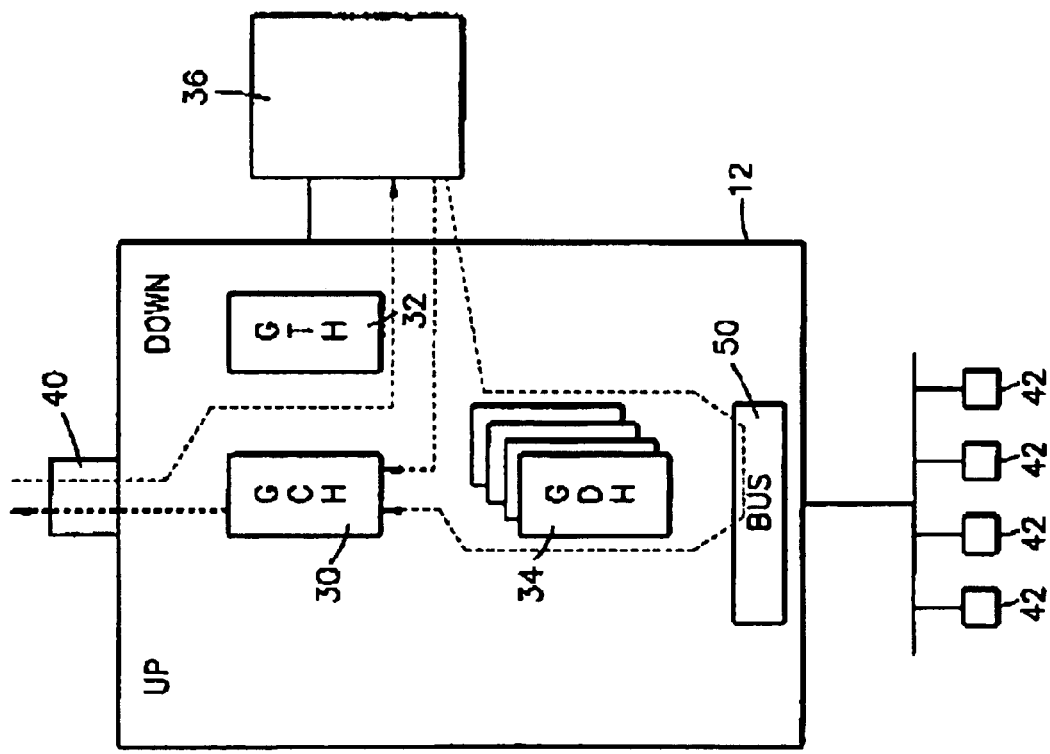
FIGS. 11 and 12 show various traffic flow patterns in a single network processor.

The guided traffic received from the Switch 40 interface on the downside in FIG. 11 is also identified by its header and stored in the NP memory 36. The traffic is dispatched to the GCH downside when the EOF is encountered. The GCH 30 on the downside must examine the guided traffic to determine whether the frame is intended for this network processor 12 or the CP 10. If the frame is intended for this NP 12, the GCH 30 will analyze the frame and perform the operation indicated by the guided traffic. Otherwise, the GCH 30 forwards the frame to the CP 10. The guided traffic flow with the CP remotely attached is shown in FIG. 12. Guided traffic sent by the CP 10 is received on the Switch 40 interface and identified as being guided traffic by its header. The guided traffic is stored in the NP memory 36 and dispatched to the GCH 30 downside when the EOF is encountered. The GCH 30 does not need to examine the guided traffic to determine whether the frame is intended for this network processor 12 or some other network processor in the system. Receiving guided traffic for another network processor 12 is an error condition. The GCH 30 analyzes the frame and performs the operation indicated by the guided traffic. If the GCH 30 needs to respond to the frame, it places the response in the NP memory 36.

Any guided traffic received from the wrap on the upside in FIG. 12 is identified by its header and stored in the NP memory 36. The traffic is dispatched to the GCH 30 upside when the EOF is encountered. The GCH 30 on the upside examines the guided traffic to determine whether the frame is intended for this network processor 12 or the CP 10. If the frame is intended for this NP 12, the GCH 30 will analyze the frame and perform the operation indicated by the guided traffic. Otherwise, the GCH 30 will forward the frame to the CP 10 via the Switch 40 interface.

Figure 13:
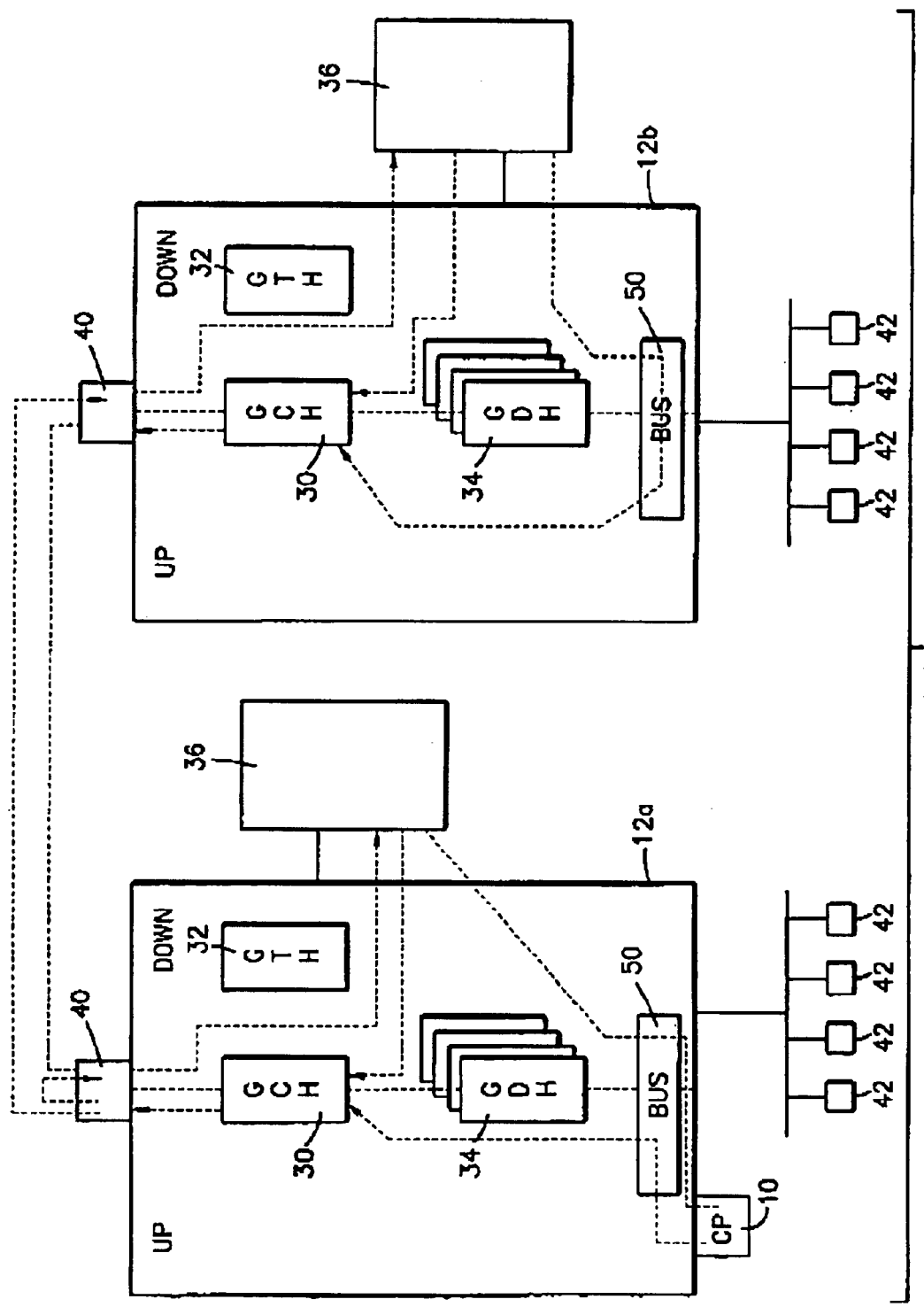
FIG. 13 shows a traffic flow pattern in the configuration of FIG. 3.

The guided traffic flows for multiple NP subsystems can be seen in FIG. 13. It should also be noted that the GCH 30 on any NP 12 can send unsolicited guided traffic to the CP 10 on any other NP 12.

It should be noted that more than one CP 10 may be employed in a system, each CP 10 being connected to a different network processor 12*a,* 12*b* . . . 12*n.* This can be to provide redundancy to the system. This can also be for Load balancing applications.

As indicated above, the GCH 30 processes guided frames containing one or more guided commands. The origin of these guided frames can be the control point processor (CP) 10 or a guided data handler GDH 34 within each network processor 12. This section describes the flow of guided frames into and out of the GCH 30. It also describes the frame parsing operations that are performed within the GCH when a guided frame is received.

As indicated above, the GCH is a pico processor that exists on a network processor 12 and its primary function is to provide supporting functionality that enables the CP 10 to define and control the overall behavior of the network processor 12. Its clients are the CP 10 and, to a lesser extent, the GDHs 30 on each network processor. As indicated earlier, the GCH has both an upside and a downside component. The message flows associated with the GCH varies slightly depending on whether it exists on a primary network processor 12*a* that is connected directly to the control point 10 or on a secondary network processor 12*b* . . . 12*n* connected to a primary network processor 12*a*

Based on the origin of guided frames in the network processor 12 on which the GCH resides, the following cases are described hereinafter:

1. GCH flows on the primary network processor
2. GCH flows on a secondary network processor
3. GCH flows on multiple network processor The following are a set of points that are to be noted regarding message flows:

Guided frames may be targeted for one or more network processors.

Guided frames can either be request frames or response frames. Request frames are destined for a GCH or a GTH one or more network processors 12*a* . . . 12*n.* The only exception is the unsolicited guided frame. This frame originates from a GCH/GTH/GDH. Response frames are always destined for the CP 10.

Guided request frames from a CP are always routed to the upside component of the GCH 30 residing on the primary network processor. Appropriate bits in the frame indicate explicitly whether the ultimate destination of that frame is the GCH or the GTH residing on one or more network processors.

Guided request frames destined for a GCH 30 also indicate the side on which the frame should be processed (i.e. upside or downside).

Guided request frames from the CP 10 indicate whether a response is required or not. If a response is required, it also indicates the type of response expected (early acknowledgment, late acknowledgment or negative acknowledgment). In cases where no response is required, the message flows from the GCH to the CP do not apply. Guided request frames flowing from a GDH 34 to a GCH 32 are always one way. No response is sent from the GCH 32 to a GDH 34.

Flows Between the CP 10 and the GCH 30 on the Primary Network Processor

Figure 14:
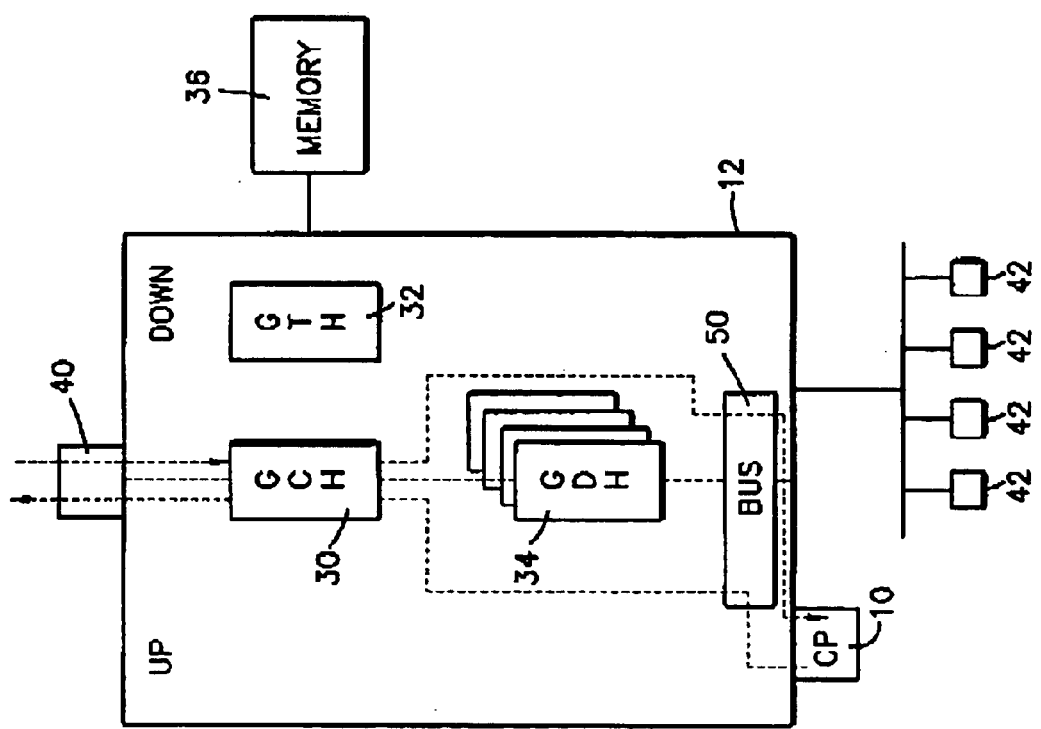

FIG. 14 shows the message flows between the CP 10 and a GCH 30 residing on the primary network processor 12*a.*

Case I: Guided Request Frame Destined for the Upside GCH

The message sequence is as follows: 1. A guided frame is generated by the CP 10 and transmitted to the primary network processor 12a (assuming that the frame contains bits that indicate that a response is required). 2. The frame is received by the up GCH 30 on the primary network processor 12a and parsed. The results of parsing indicate that the frame is destined for itself. Therefore, the frame is processed by the up GCH 30. 3. Assuming that the processing was successful, the results are stored in the network processor 12a and the frame control information is modified to indicate that the frame is now a response frame. It is then dispatched to the source of the request. This causes the frame to reach the down GCH of the primary network processor 12a via the Switch 40 interface. The down GCH 30 parses the frame, notes that the frame is a response frame, and dispatches it in the appropriate down target port queue. This causes the frame to be received and sent out through the port connected to the CP 10. The CP 10 eventually receives the response frame.

Case II: Guided Request Frame Destined for the Down Side GCH

The message sequence is as follows: 1. A guided frame is generated by the CP 10 and transmitted to the primary network processor 12a, assuming that the frame contains bits that indicate that a response is required. 2. The frame is received by the up GCH 30 on the primary network processor 12a and parsed. The results of parsing indicate that the frame is destined for the down GCH 30. Therefore, the frame is dispatched to the queue with the target network processor 12a set to the primary network processor 12a. This causes the frame to reach the down GCH 30. 3. The down GCH 30 parses the frame and finds that it is destined for itself. Therefore, it processes the frame and builds a response frame. 4. The response frame is encoded in the appropriate down target port queue. This causes the frame to be sent out through the port connected to the CP 10. 5. The CP 10 eventually receives the response frame.

Flows Between a GDH and the GTH on the Primary Network Processor

Figure 15:
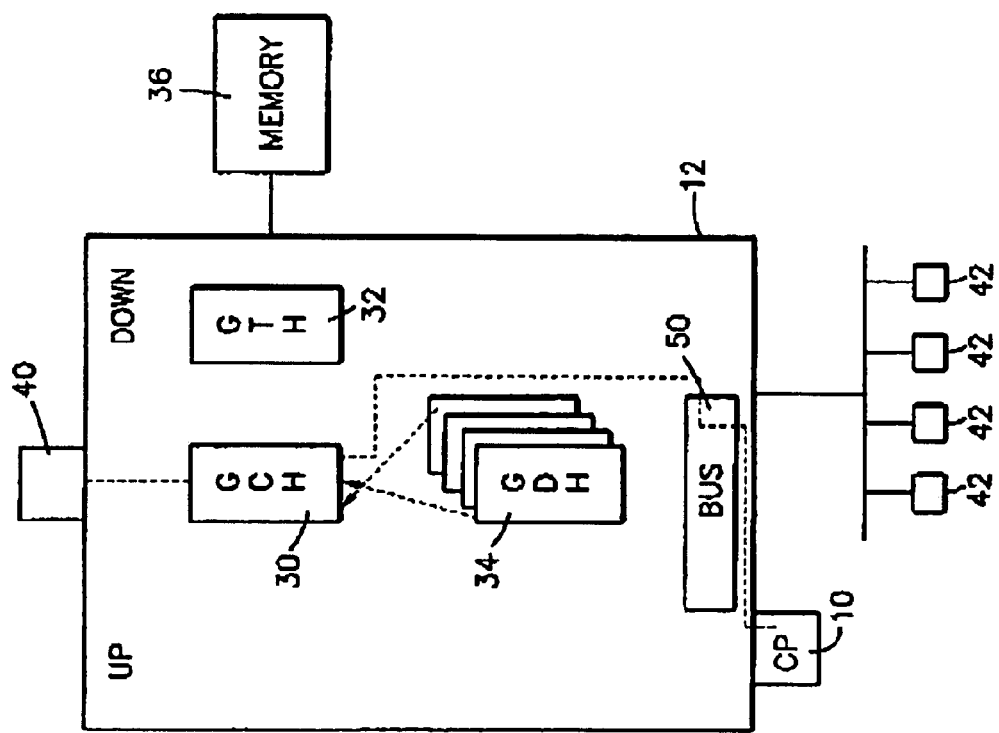
FIGS. 14 and 15 show various traffic flow patterns in a single network processor.

FIG. 15 shows the message flows between the GDH 34 and the GTH 32 on the primary network processor 12a.

Case I: Up GDH to Up GCH

The message sequence is as follows: 1. An up GDH 34 on the primary network processor 12a builds a guided frame destined for the up GCH 30 on the same network processor 12a. 2. The frame is encoded to the up GCH 30 queue on the primary network processor 12a. 3. The frame is received by the up GCH 30. Frame processing indicates that it is destined for itself. Therefore, the up GCH 30 processes the frame. 4. Assuming no errors were encountered, the frame is encoded to the up discard queue after processing. 5. If an error was encountered and the frame header indicated that a negative acknowledgment was required, a negative acknowledgment frame is built and enqueued. 6. The response frame is received by the down GCH 30. It examines the frame header, learns that it is a response frame and so dispatches it to the appropriate down target port queue. 7. This causes the negative acknowledgment frame to reach the CP 10.

Case II: Up GDH to Down GCH

The message sequence is as follows: 1. An up GDH 34 on the primary network processor 12a builds a guided frame destined for the down GCH 30 The GDH 30 dispatches the frame to the up GCH 30 queue. The up GCH 30 receives and parses the frame. The frame indicates that it is destined for the down GCH 30. The GDH 34 may choose to directly enqueue the frame The frame is received and processed by the down GCH 30. Assuming no errors were encountered, the frame is encoded to the down discard queue after processing. 5. If an error was encountered and the frame indicated that a negative acknowledgment was required, a negative acknowledgment frame is built and encoded to the appropriate down target port queue. 6. The negative acknowledgment frame is received by the CP 10.

Case III: Down GDH to Down GCH

The message sequence is as follows: 1. A down GDH 34 on the primary network processor 12 builds a guided request frame using the down data store destined for the down GCH 30 on the primary network processor 12a. It dispatches the frame to the down GCH 30 queue. 2. The down GCH 30 receives and processes the frame. Assuming that the processing was successful, the frame is encoded to the down discard queue. 3. If an error was encountered and the frame indicated that a negative acknowledgment was required, a negative acknowledgment frame is built and dispatched to the appropriate down target port queue. 4. The negative acknowledgment frame is received by the CP 10.

Case IV: Down GDH to Up GCH

The message sequence is as follows: 1. A down GDH 34 on the primary network processor 12a builds a guided frame destined for the up GCH 30. The frame is received and processed by the up GCH 30. Assuming no errors were encountered, the frame is encoded to the up discard queue after processing. 5. If an error was encountered and the frame indicated that a negative acknowledgment was required, a negative acknowledgment frame is built and encoded to the up multicast queue. 6. The frame is received by the down GCH 30. Frame parsing indicates that the frame is a response frame. Therefore, the down GCH 30 encases the frame to the appropriate down target port queue. 7. The negative acknowledgment frame is received by the CP 10.

Figure 16:
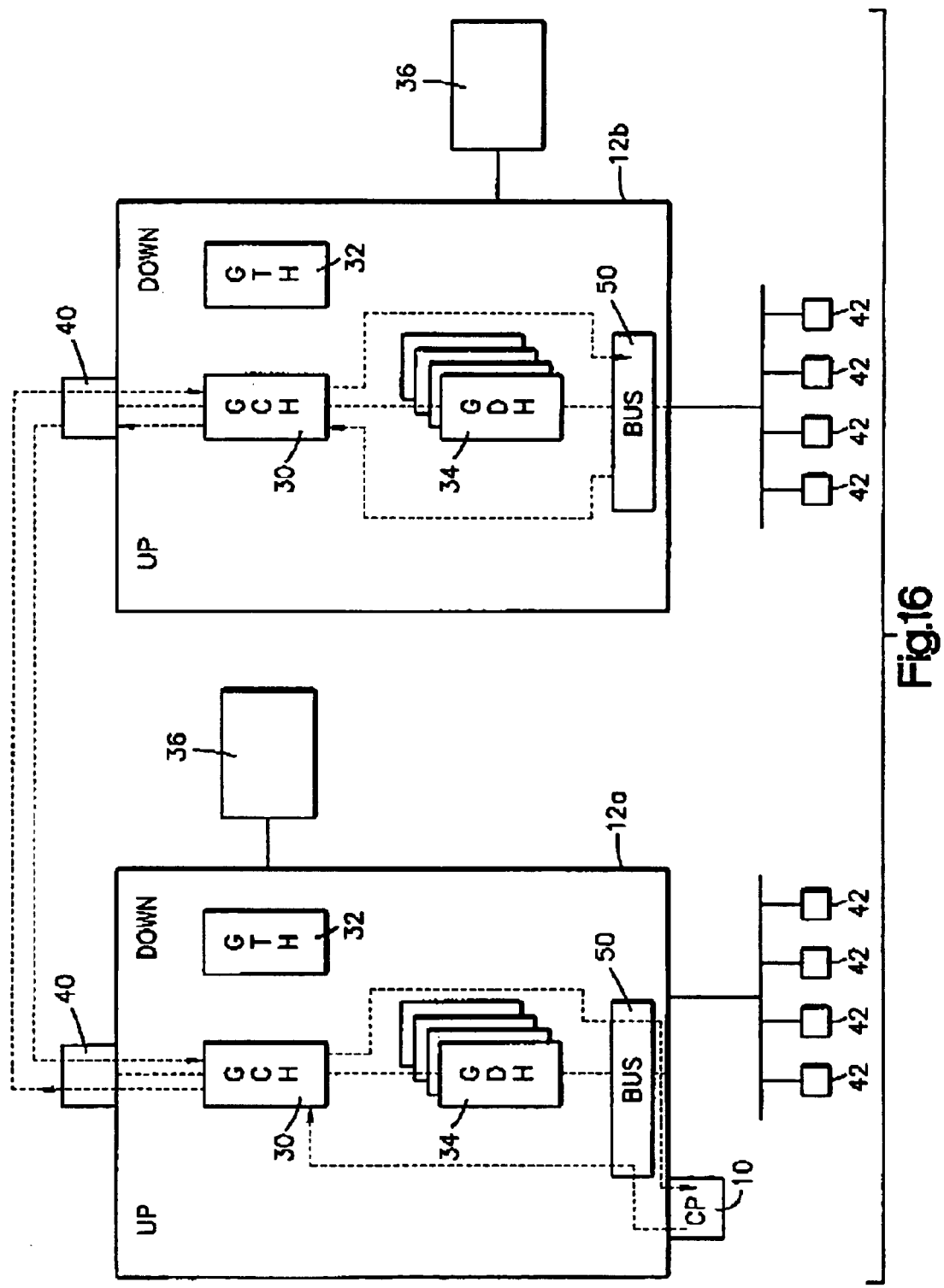
FIGS. 16 and 17 show various traffic flow patterns in the configuration of FIG. 3.

Secondary Network Processor Flows Between the CP and the GCH on the Secondary Network Processor FIG. 16 shows the message flows between the CP 10 and a GTH 32 residing on a secondary network processor 12b . . . 12n. The flows are considered on a case-by-case basis, as described below:

Case I: Guided Request Frame Destined for the Down GCH

The message sequence is as follows: 1. A guided frame is generated by the CP 10 and transmitted to the primary network processor 12a, assuming that the frame contains bits that indicate that the frame is targeted for the down GCH residing on a secondary network processor 12b, and that a response is required. 2. The frame is received by the up GCH 30 on the primary network processor 12a and parsed. The results of parsing indicate that the frame is destined from the GCH 30 on a secondary network processor 12b. 3. The frame is dispatched with the target network processor 12b address set appropriately. This causes the frame to be sent to the down GCH 30 residing on the targeted network processor 12b. 4. The down GCH 30 parses the frame and notes that the frame is destined for itself. 5. The down GCH 30 processes the request frame and builds a response frame. 6. The down GCH 30 sends the response to the up GCH 30 component on the same network processor 12b by enqueueing the response to the wrap queue. 7. The up GCH 30 frame parsing operation indicates that this is a response frame. Therefore, the frame is routed to the CP 10 by enqueueing the frame on the up multicast queue after setting the target network processor 12b address to that of the primary network processor 12a. 8. The frame is received via the Switch 40 interface by the down GCH 30 on the primary network processor 12a. The frame is parsed and indicates that it is a response frame. Therefore, the down GCH 30 encases the frame to the appropriate down target port 9. This causes the frame to be transmitted to the CP 10.

Case II: Guided Request Frame Destined for the Up GCH

The message sequence is as follows: 1. A guided frame is generated by the CP 10 and transmitted to the primary network processor 12a, assuming that the frame contains bits that indicate that the frame is targeted for the up GCH residing on a secondary network processor 12b, and that a response is required. 2. The frame is received by the up GCH 30 on the primary network processor 12a and parsed. The results of parsing indicate that the frame is destined for the GCH 30 on a secondary network processor 12b. 3. The frame is dispatched to the target network processor 12b address set appropriately. This causes the frame to be sent to the down GCH 30 residing on the targeted network processor 12b. the down GCH 30 parses the frame and notes that the frame is destined for the upside component of itself. Therefore, it encases the frame to the wrap queue (not shown). This causes the up GCH 30 to receive the frame. 5. The up GCH 30 processes the request frame and builds a response frame. 6. The frame is routed to the CP 10 after setting the target network processor 12b address to that of the primary network processor 12a. 7. The frame is received via the Switch 40 interface by the down GCH 30 on the primary network processor 12a. The frame is parsed and indicates that it is a response frame. Therefore, the down GCH 30 dispatches the frame to the appropriate down target port 8. This causes the frame to be transmitted to the CP 10.

Flows Between a GDH and the GCH on a Secondary Network Processor

Figure 17:
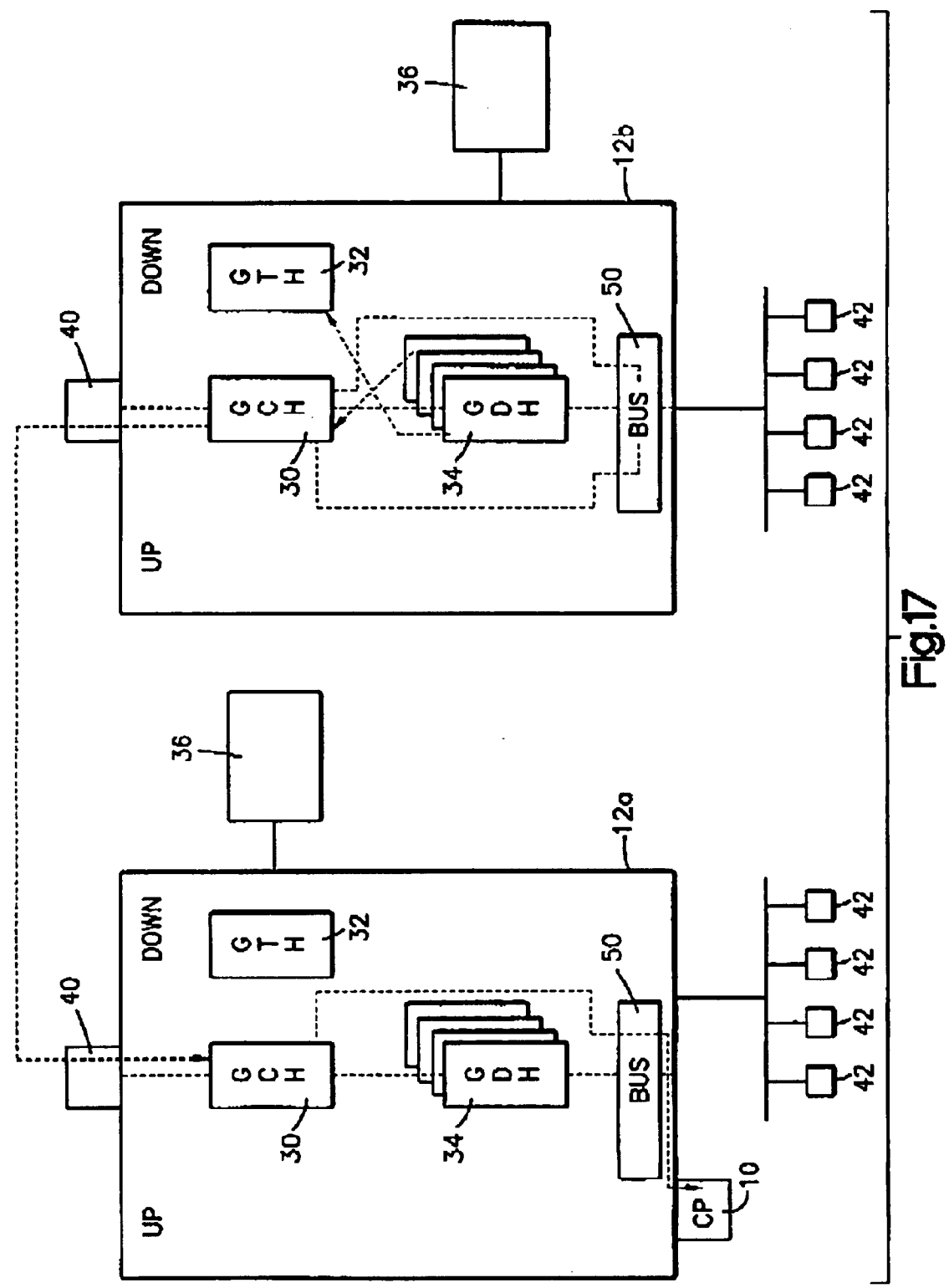

FIG. 17 shows the message flow between a GDH and a GCH on a secondary network processor 12b. The flow is identical to that described for the primary network processor. The only difference is the path followed by the negative acknowledgment message generated by the GCH 30 in case of an error. In the case of the up GCH 30 processing the request frame, the negative acknowledgment frame is dispatched to the primary network processor 12a as the target network processor 12 in the case of the down GCH 30. This message is wrapped to the up GCH 30 on the secondary network processor 12b. The up GCH 30 routes the frame to the down GCH 30 of the primary network processor 12a. When the down GCH 30 of the primary network processor receives the frame, it parses the latter. The parsing indicates that the frame is a response frame and is, therefore, routed to the CP 10 by dispatching it to the appropriate down target port. It is also possible for the up GCH 30 on the secondary network processor 12b to build a frame and route it directly to the CP 10 by dispatching it to the appropriate up target port, ensuring that the target network processor address is set to that of the primary network processor.

Multi-Network Procedure Flows

Flows Between the CP and GCHs on the Primary and Secondary Network Processor

The message flows associated with this case is a combination of the message flows described for primary and secondary network processors. When a frame is received from the CP 10 by the up GCH 30 on the primary network processor 12a, it is parsed. The results of parsing indicate that the frame is destined for GCHs on multiple network processors 12b ... 12n. The frame is, therefore, forwarded to all the targeted network processors dispatching it to the primary network processor 12a. The processing of the frame when it is received by the down GCH on the target network processor remains the same as described previously. It should be noted that multiple response frames will be sent to the CP 10 corresponding to the number of network processors that were originally targeted.

Flows Between a GDH and GCHs on Primary and Secondary NPs

This is similar to the case described above with the condition that no responses are ever sent back to the originating GDH 34. If negative acknowledgment was specified then, under error conditions, one or more negative acknowledgement frames could be sent to the CP 10.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed is:

1. A control system for a network processing system which includes a plurality of network processors and at least one control point unit, and wherein each control point unit is directly connected to a different network processor, each of said network processors having at least three pico processors, one of which is a guided cell handler, one of which is a guided table handler, and the rest of which are general data handlers;

a control information path between each said control point unit and the guided cell handler on the network processor connected directly thereto and between the guided cell handler of each network processor, and a data path between each control point unit and the general data handler on said network processor connected directly thereto and between the general data handler on each of said network processors, whereby control information can be transferred and controlled independently of said data.

2. The invention as defined in claim 1 wherein said guided table handler performs tree building operations based on information carried on said control information path.

3. The invention as defined in claim 1 wherein there is a communication path between the guided cell handler and the general data handler on each network processor and between the guided cell handler and the guided table handler on each network processor.

4. The invention as defined in claim 1 wherein there is a communication path between the guided table handler and the general data handlers on each network processor.

5. The invention as defined in claim 1 wherein said guided cell handler can function as a general data handler.

6. The invention as defined in claim 1 wherein at least one network processor is a secondary network processor connected to a control point unit through a primary network processor which is connected directly to said control point unit.

7. The invention as defined in claim 6 wherein communication with said control point and said secondary network processor is through said primary network processor.

8. The invention as defined in claim 7 wherein said communication of control information between said control point and said secondary network processor is through the guided cell handler on said primary network processor.

9. The invention as defined in claim 1 wherein there are a plurality of general data handlers on each network processor.

10. The invention as defined in claim 1 wherein responses when required are carried on said control path.

11. A method of controlling information and data flow in a network processing system which includes a plurality of network processors and at least one control point unit, and wherein each control point unit is directly connected to a different network processor, each of said network processors having at least three pico processors, one of which is a guided cell handler, one of which is a guided table handler, and the rest of which are general data handlers, sending control information on a path between each said control point unit and the guided cell handler on the network processor connected directly thereto and between the guided cell handler of each network processor, and general data on a data path between each control point unit and the general data handler on said network processor connected directly thereto and between the general data handler on each of said network processors, whereby control information is transferred and controlled independently of said data.

12. The invention as defined in claim 11 wherein said guided table handler preforms tree building options based on information carried on said control information path.

13. The invention as defined in claim 11 wherein there is a communication path between the guided cell handler and the general data handler on each network processor and between the guided cell handler and the guided table handler on each network processor.

14. The invention as defined in claim 11 wherein there is a communication path between the guided table handler and the general data handlers on each network processor.

15. The invention as defined in claim 11 wherein said guided cell handler can function as a general data handler.

16. The invention as defined in claim 11 wherein it least one network processor is a secondary network processor connected to a control point unit through a primary network processor connected to said control point unit.

17. The invention as defined in claim 16 wherein communication with said control point and said secondary network processor is through said primary network processor.

18. The invention as defined in claim 17 wherein said communication of control information between said control point and said secondary network processor is through the guided cell handler on said primary network processor.

19. The invention as defined in claim 11 wherein there are a plurality of general data handlers on each network processor.

20. The invention as defined in claim 11 wherein responses when required are carried on said control path.

* * * * *